INVENTOR
Shigematsu Matsuda
BY Ernest G Montague
ATTORNEY

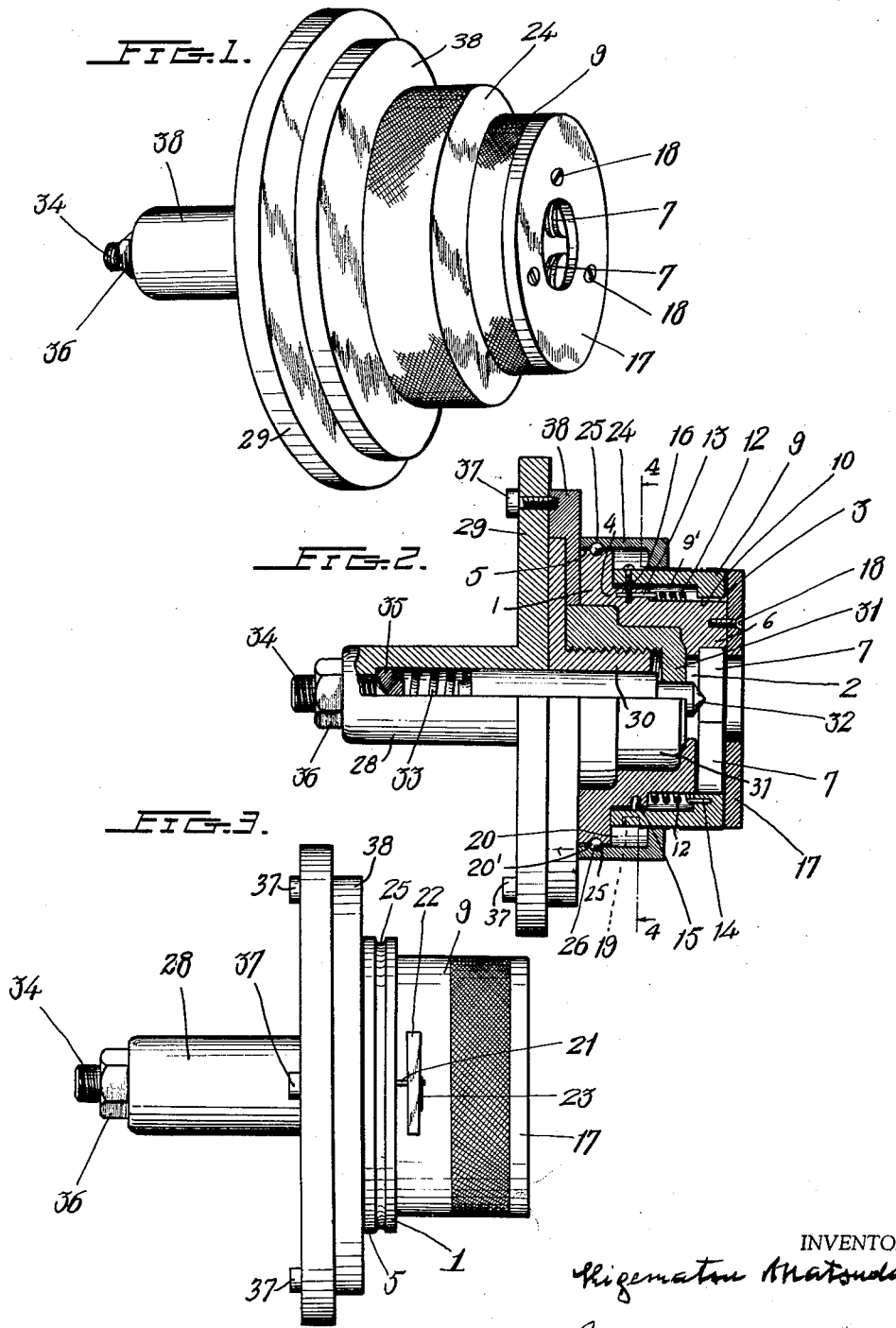

United States Patent Office 3,169,778
Patented Feb. 16, 1965

3,169,778
ROLLER JAW CHUCK
Shigematsu Matsuda, 65 Shimomaruko-cho, Ohta-Ward,
Tokyo, Japan
Filed Nov. 8, 1960, Ser. No. 68,052
Claims priority, application Japan, Nov. 14, 1959,
34/35,951
3 Claims. (Cl. 279—72)

The present invention relates to a roller jaw chuck.

In a lathe operation of conventional nature, in order to support a work piece, portions of the work piece are engaged at the middle portion thereof and their peripheral portions are clamped by a chuck, however in such cases, each time the article is clamped or released, it is necessary to stop the rotation of a motor and to apply suitable tools.

It is, therefore, one object of the present invention to provide a roller chuck, which enables to clamp or to release a work piece without stopping the motor or drive means, and without applying any specific tool.

It is another object of the present invention to provide a roller jaw chuck for a lathe, whereby the clamping of the work piece can be effected by arranging a plurality of jaw members within a cylindrical drum having an inner cam face, and by manually rotating these roller-shaped jaw members, so as to reduce the spaces between the rollers, and to effect the release of a work piece manually by reversely widening the space between the rollers manually.

It is another object of the present invention, to provide a roller jaw chuck for a lathe to which an elastic clamping force directed to the center surrounded by rollers of the jaw members is applied, and the jaw members comprise a plurality of rollers so that the clamping force is constantly applied to the roller-shaped jaw, and thereafter the chuck is opened by applying a reversely directed force to the center between the rollers.

It is still another object of the present invention, to provide a roller jaw chuck for a lathe comprising means for automatically taking off a clamped work piece by causing the specific center which contains an elastic extendedly opening force, to follow the movement of the chuck by easing the clamping force of the chucks.

With these and other objects in view, which will become apparent in the following detailed description, the present invention will be clearly understood in connection with the accompanying drawings, in which:

FIGURE 1 is a perspective side view of the entire chuck designed in accordance with the present invention;

FIG. 2 is a side view of the chuck, partly in section, along the lines 2—2 of FIG. 4;

FIG. 3 is a side view of the chuck, the sleeve being broken away for a better showing.

Figure 4:
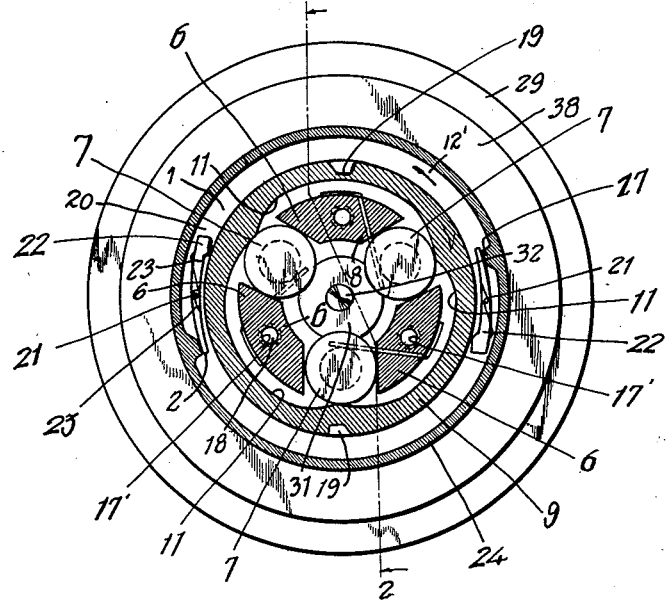
FIGS. 4 and 5 are sectional views taken along the lines 4—4 of FIG. 2 indicating the operative state of the roller-shaped chuck, FIG. 4 disclosing the clamping position, and FIG. 5 disclosing the released position.

Referring now to the drawings, the device comprises a hollow cylinder 2 disposed on the central portion of a body 1 having a front grade 3 of smallest diameter, a middle grade 4 of median diameter and a rear grade 5 of largest diameter stepped up on the periphery thereof, and on the tip of the front grade 3 are formed three lugs 6 disposed equidistantly, so as to serve as roller-guides, and a roller 7 is inserted between each pair of adjacent lugs 6 or roller-guides mounted on pivots 17'. In addition a spring wire 8 is arranged between each of the rollers 7 and the roller-guides 6 and the spring wires 8 impart constantly an outwardly and radially directed opening force thereto.

Figure 5:
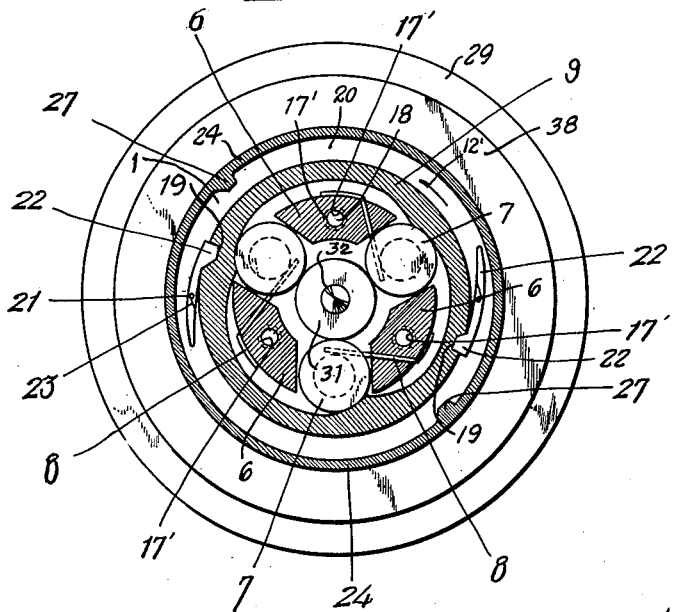

A small-sized sleeve 9 is fixed at a slight distance from the periphery of the middle grade 4, and this small-sized sleeve 9 constitutes an essential part of the chuck designed in accordance with the present invention. A flange-like portion 10 is arranged on its inner face at the tip thereof having comma-shaped inner faces of a cam, as shown in FIGS. 4 and 5, where three maximum subsided portions 11 are equidistantly formed, and each of the subsided portions 11 is sloped from the adjacent subsided portion forming a comma-shaped inner face to compensate for the thickness thereof. Further, an end 13 of a helical spring wire 12, wound about the outer periphery of the front grade 3, is fixed along and within an indented groove 9' defined between the sleeve 9 and the roller guides 6, and the other end 14 of the helical spring wire 12 is secured in a suitable position within the flange 10 on the tip of the small-sized sleeve 9. The direction of the elastic force of the helical spring wire 12 is in the direction of the arrow 12' (FIGS. 4 and 5) and it is also the rotational direction of the chuck and lathe.

In order to limit the rotation of the small-sized sleeve 9 at the moment it makes about one-third rotation just before the rollers 7 reach the subsided portions 11, a screw bolt 16 is inserted in the vicinity of the rear portion of the small-sized sleeve 9 with its tip inserted into an indented annular groove 15 on the middle grade 4. The end of the screw bolt 16 is disposed slidably within the groove 15 on the outer periphery of the middle grade 4. After a one-third rotation of the small-sized sleeve 9, the rotation of the latter is stopped by abutment of the screw bolt bottom the end 13 of the helical spring wire 12 which crosses the groove 15 provided therein. When the end 13 of the spring wire 12 engages the screw bolt 16, all of the rollers 7 ride up on the portions of maximum thickness, namely, of the inner faces of the comma-shaped cam of the small-sized sleeve 9, in which case the spaces between the three rollers 7 will be smallest. When the rollers 7 move, however, into a position in which they contact portions of a minimum thickness of the small-sized sleeve 9, in other words, onto the subsided portions 11, the space between each pair of adjacent rollers 7 will be increased.

Thus, the spaces between the three rollers 7 are narrowed or widened, respectively, by the rotation of the rollers 7 over the inner faces of the comma-shaped cam 9, hence, if the article to be treated or the work piece is inserted between the rollers 7, the work piece can be clamped in position.

A cover plate 17 is secured to the front of the body 1, so that the rollers 7 cannot escape in axial direction. The cover plate 17 is fixed to the body 1 by means of screw bolts 18 which are received in the roller-guides 6 of the body 1.

In the vicinity of the rear end of the small-sized sleeve 9, a recess 19 is provided, which is adapted to stop the rotation of the small-sized sleeve 9.

The rear grade 5 of the body 1 has a groove 20 on the outer peripheral side thereof, and two pins 21 are fixed on side portions of the body 1, while a double-armed locking pawl 22 engages the latter rotatably with the pins 21 as the axis of the locking pawl 22. A downward force is applied to one end of the locking pawl 22 by means of a spring wire 23 urging said end of the locking pawl 22 radially inwardly.

A large-sized sleeve 24 is arranged in a manner covering the rear half of the small-sized sleeve 9 and a fixing ring 26 is inserted in a groove 25 which is cut on the inner periphery of the large-sized sleeve 24 and on the outer periphery of the rear grade 5 of the body 1. The fixing ring 26 retains the large-sized sleeve 24 at its predetermined position through its elastic force and prevents the large-sized sleeve 24 from slipping out to the front. Besides, lugs 27 are arranged at two points on the inner face of the large-sized sleeve 24. The function of the lugs 27 will be explained below.

If a work piece is placed into the chuck, the exposed outer face of the small-sized sleeve 9 is manually turned and the small-sized sleeve 9 only will stop its rotation momentarily or its rotating momentum is delayed, as compared with that of the other parts, so that the body 1 rotates and resists the pressing force of the spring wire 12 which is wound on the outer periphery thereof. Three rollers 7 are fitted within the inner faces of a flange-like cam in the front of the body 1 and move into the subsided portions 11 on the inner faces of the cam, when the end of the locking pawl 22 engages and enters a stop recess 19 by the force of the spring wire 23, which stop recess 19 is provided on the outer periphery of the small-sized sleeve 9. Hence, the body 1 and the small-sized sleeve 9 engage each other, and the rollers 7 continue to rotate to maintain their greatest distance from the adjacent rollers 7.

Upon inserting a work piece between the three rollers 7, and upon rotation of the large-sized sleeve 24, the latter will either stop or the rotation thereof will be delayed, as compared with that of the other parts. Then, inasmuch as the lugs 27 are arranged on the inner face of the large-sized sleeve 24 and press then the rear end of the locking pawl 22 radially inwardly, the other end of the locking pawl 22 will be moved radially outwardly and released from the stop recess 19. Because a rotating force is constantly applied to the small-sized sleeve 24 by the spring wire 12, as described, the small-sized sleeve 9 starts rotation, as soon as the operative end of the locking pawl 22 is released from the stop recess 19. At this moment, as the inner faces of the cam, with which the rollers 7 are in engagement, move to the areas of maximum thickness of the small-sized sleeve 9 from the subsided portions 11, the rollers 7 are pressed inwardly against the pressure of the spring wire 8, which always tends to push outwardly the rollers 7, thus maintaining the minimum spaces between the rollers 7.

In order to remove a work piece, the spaces between the rollers 7 are widened, by merely the small-sized sleeve 9. Upon moving the rollers 7 radially outwardly, the work piece is released automatically, and for this purpose, the chuck designed in accordance with the present invention further comprises a front head portion 30 which is disposed on the front face of a flange plate 29 which extends into a cylindrical portion 28 defining a chamber which extends into the body 1; a cap 31 fits into the chamber 2 of the chuck body 1. A center member 32 of the chuck is inserted into the cylinder 28 and a cylindrical portion of the front head portion 30 projects into a recess of the cap 31, the cylinder 28 receiving a helical spring 33 therein. In addition an adjustable pressing screw 34 is screwed into the rear end of the receiving cylinder 28. The screw 34 receives at the inner end thereof a washer 35 engaging the helical spring 33, and the screw 34 in conjunction with the spring 32 supports the center 32 elastically. A lock nut 36 is mounted on the screw 34 and a screw bolt 37 secures the center flange 29 to the rear plate 38 of the chuck. The body 1 is secured to the rear plate 38 by any conventional means. In order to form gripping portions on the outer faces of the sleeves 9 and 24, it is preferable to provide suitable roughened surfaces thereon.

In the use of the chuck, designed in accordance with the present invention, and of a structure described above, not only gripping and releasing a work piece to be treated can be effected with an extremely simple gripping manipulation of a worker's hand without the need of any auxiliary tool, but also operation of the lathe with no necessity of stopping the lathe each time the chuck is manipulated, with a resultant operation of very convenient and satisfactory efficiency is possible.

While I have disclosed one embodiment of the present invention, it is to be understood that this embodiment is given by example only and not in a limiting sense, the scope of the present invention being determined by the objects and the claims.

I claim:
1. A roller jaw chuck comprising
   a hollow chuck body having a front grade of smallest diameter, a middle grade of median diameter, and a rear grade of largest diameter,
   said grades being formed as concentric cylindrical faces of different diameters as outer faces of said hollow chuck body,
   said hollow chuck body forming at its front end three lugs equidistantly angularly disposed relative to each other,
   a roller disposed between each pair of adjacent lugs and radially movable within said hollow chuck body,
   resilient means secured to said lugs urging said rollers in radial outward direction,
   a first sleeve surrounding said hollow chuck body and defining a first annular chamber about said front grade of said hollow chuck body,
   a helical spring wire disposed in said first annular chamber,
   one end of said helical spring wire being secured to said hollow chuck body and the other end of said helical spring wire being secured to said first sleeve,
   means permitting rotation of said first sleeve relative to said hollow chuck body for a predetermined angle against the force of said helical spring wire,
   said one end of said helical spring wire operating as abutment means to limit the rotation of said first sleeve,
   a second sleeve surrounding said first sleeve and defining a second annular chamber between said first and said second sleeve,
   said second sleeve engaging said rear grade of said hollow chuck body,
   means permitting rotation but preventing axial movement between said second sleeve and said hollow chuck body,
   said first sleeve having inner cam faces of varying diameter engaging said rollers, so that upon rotation of said first sleeve said rollers are urged radially inwardly and moved radially outwardly by said resilient means of said lugs upon return rotation of said first sleeve member,
   said first sleeve member having at least one recess at its outer periphery,
   a double-armed locking pawl pivotally mounted on said hollow chuck body and disposed in said second annular chamber,
   resilient means urging the operative end of said locking pawl into engagement with the outer face of said first sleeve and in a predetermined rotary position of said first sleeve into said recess of the latter,
   at least one lug extending radially inwardly from the inner face of said second sleeve, so that upon relative rotation between said first sleeve and said second sleeve said lug engages the rear end of said locking pawl, thereby withdrawing said operative end from said recess of said first sleeve,
   a center member disposed within and coaxially with said hollow chuck body, and
   resilient means engaging said center member and urging the latter axially forwardly, in order to expel a workpiece from said hollow chuck body upon release of said workpiece from said rollers.
2. The roller jaw chuck, as set forth in claim 1, wherein said means permitting rotation of said first sleeve relative to said hollow chuck body comprises a bolt extending radially through said first sleeve, and said hollow chuck body has at its outer surface an annular groove receiving the inner end of said bolt, thereby preventing axial movement of said first sleeve.

3. The roller jaw chuck, as set forth in claim 1, wherein said means permitting rotation but preventing axial movement between said second sleeve and said hollow chuck body comprises a fixing ring disposed in complementary grooves of said second sleeve and of said rear grade of said hollow chuck body.

References Cited by the Examiner

UNITED STATES PATENTS

| 1,162,197 | 11/15 | Wahlstrom | 279—72 |
| 1,458,359 | 6/23 | Riley. | |
| 1,879,656 | 9/32 | Brown. | |
| 2,400,169 | 5/46 | Seiffert | 279—72 |
| 2,539,045 | 1/51 | Waring | 279—72 |
| 2,817,533 | 12/57 | Herbst | 279—33 |
| 2,883,198 | 4/59 | Narumi | 279—33 |

ROBERT C. RIORDON, *Primary Examiner.*

RALPH H. BRAUNER, KARL J. ALBRECHT,
*Examiners.*